(12) United States Patent
Kopelman et al.

(10) Patent No.: US 8,577,854 B1
(45) Date of Patent: Nov. 5, 2013

(54) APPARATUS AND METHOD FOR HIGH SPEED FLOW CLASSIFICATION

(75) Inventors: Yaniv Kopelman, Holon (IL); Carmi Arad, Nofit (IL); Nafea Bishara, Tarshiha (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 2556 days.

(21) Appl. No.: 10/179,483

(22) Filed: Jun. 24, 2002

Related U.S. Application Data

(60) Provisional application No. 60/333,707, filed on Nov. 27, 2001.

(51) Int. Cl.
*G06F 7/00* (2006.01)

(52) U.S. Cl.
USPC .......................................... 707/696

(58) Field of Classification Search
USPC ............ 707/1–10, 100–104.1, 200–205, 696; 370/229, 392
See application file for complete search history.

(56) References Cited

U.S. PATENT DOCUMENTS

| | | | |
|---|---|---|---|
| 5,642,304 A | 6/1997 | Simpson | |
| 6,212,184 B1 | 4/2001 | Venkatachary et al. | |
| 6,223,172 B1* | 4/2001 | Hunter et al. | 707/3 |
| 6,289,013 B1 | 9/2001 | Lakshman et al. | |
| 6,393,428 B1* | 5/2002 | Miller et al. | 1/1 |
| 6,449,256 B1 | 9/2002 | Varghese et al. | |
| 6,484,171 B1 | 11/2002 | Corl et al. | |
| 6,515,963 B1* | 2/2003 | Bechtolsheim et al. | 370/229 |
| 6,547,829 B1* | 4/2003 | Meyerzon et al. | 715/234 |
| 6,553,372 B1* | 4/2003 | Brassell et al. | 1/1 |
| 6,633,860 B1 | 10/2003 | Afek et al. | |
| 6,651,096 B1 | 11/2003 | Gai et al. | |
| 6,687,247 B1* | 2/2004 | Wilford et al. | 370/392 |
| 6,691,168 B1 | 2/2004 | Bal et al. | |
| 6,745,192 B1* | 6/2004 | Libenzi | 1/1 |
| 6,778,984 B1 | 8/2004 | Lu et al. | |
| 6,792,423 B1* | 9/2004 | Jeffries et al. | 1/1 |
| 6,807,576 B1 | 10/2004 | Jeffries et al. | |
| 7,024,431 B1 | 4/2006 | Kornelson et al. | |
| 7,039,053 B1 | 5/2006 | Freed et al. | |
| 7,058,642 B2* | 6/2006 | Kurupati et al. | 1/1 |
| 7,136,926 B1 | 11/2006 | Iyer et al. | |
| 2003/0065632 A1 | 4/2003 | Hubey | |
| 2003/0093616 A1* | 5/2003 | Slavin | 711/108 |

OTHER PUBLICATIONS

University of California Berkeley, Espresso (CAD Group), UC Berkeley Design Technology Warehouse Homepage, Aug. 22, 1986, 18 pages, UC Berkeley, US.

(Continued)

*Primary Examiner* — Hosain Alam
*Assistant Examiner* — Eliyah S Harper

(57) ABSTRACT

A flow classifier for a network device that processes packets including packet headers includes a hash generator that generates hash index values from search keys derived from the packet headers. A hash table receives the hash index values and outputs pointers. A flow table includes flow keys and corresponding actions. A variable length (VL) trie data structure uses the pointers to locate the flow keys for the search keys. The VL trie data structure selects different flow keys for the search keys that share a common hash index value. The pointers include node, NIL and leaf pointers. The flow classifier performs a default action for the NIL pointers. A pointer calculator accesses a VL trie table using the pointers.

50 Claims, 9 Drawing Sheets

(56) References Cited

OTHER PUBLICATIONS

Lakshman, T.V., et al., High-Speed Policy-Based Packet Forwarding Using Efficient Multi-Dimensional Range Matching, 1998, pp. 1-12, Bell Laboratories, SIGCOMM98, Vancouver, B.C., Canada.

Waldvogel, Marcel, Multi-Dimensional Prefix Matching Using Line Search, 2000, pp. 1-8, Washington University, IEEE LCN 2000, Tampa, FL, US.

Srinivasan, V., et al., Fast and Scalable Layer Four Switching, 1998, pp. 1-6, SIGCOMM98, Vancouver, B.C., Canada.

Nowick, Steven, The Quine-McCluskey Method, Feb. 22, 2001, pp. 1-14, Columbia University, US.

Keutzer, Kurt, EE244: Design Technology for Integrated Circuits and Systems, Fall 1998, pp. 1-52, Univerity of California at Berkeley, US.

Brayton, Robert, et al., Logic Minimization Algorithms for VLSI Synthesis, 1984, pp. 54-61, Kluwer Academic Publishers, US.

Rudell, Richard, Espresso 10CTTools, Jan. 31, 1988, pp. 1-6, University of California at Berkeley, US.

Pankaj Gupta and Nick McKeown, "Packet Classification on Multiple Fields" Computer Systems Laboratory, Stanford University, SIGCOMM '99 Aug. 1999 Cambridge, MA, USA.

T.V. Lakshman and D. Stiliadis, "High-Speed Policy-based Packet Forwarding Using Efficient Multi-dimensional Range Matching" Bell Laboratories, Holmdel, NJ.

V. Srinivasan, G. Varghese, S. Suri, M. Waldovogel, "Fast and Scalable Layer Four Switching" Computer Science Department, Washington University and ETH.

Marcel Waldvogel, "Multi-Dimensional Prefix Matching Using Line Search" Computer Science Department, Washington University, St. Louis, MO, USA.

\* cited by examiner

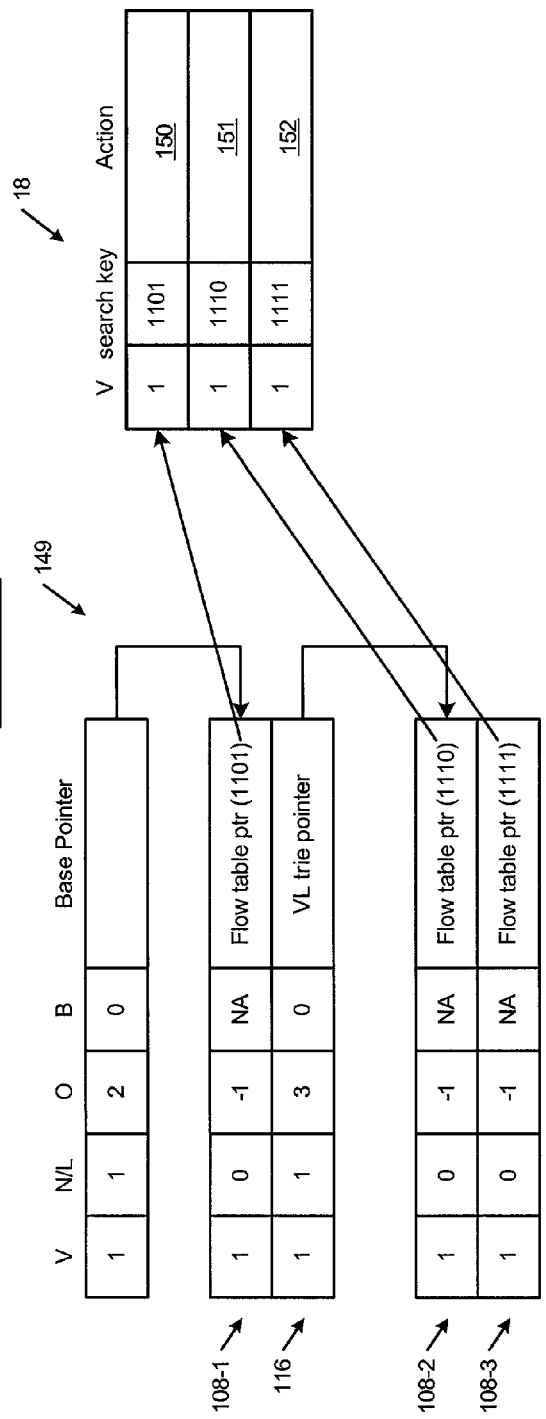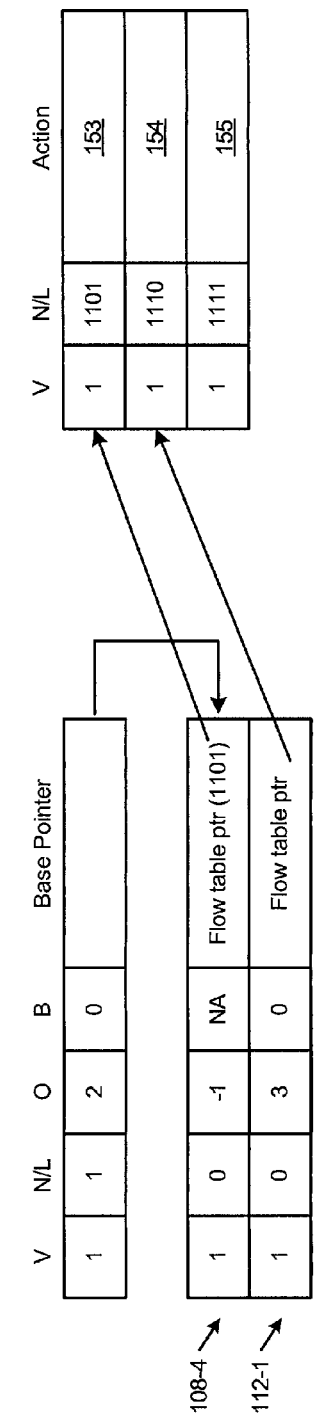

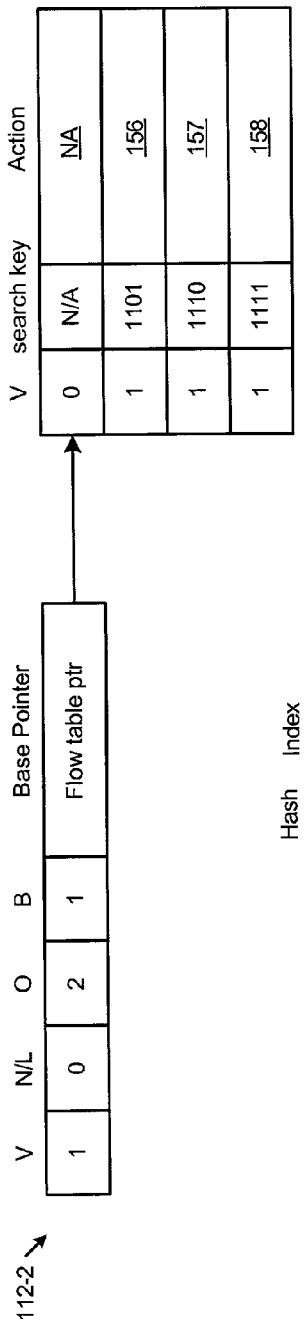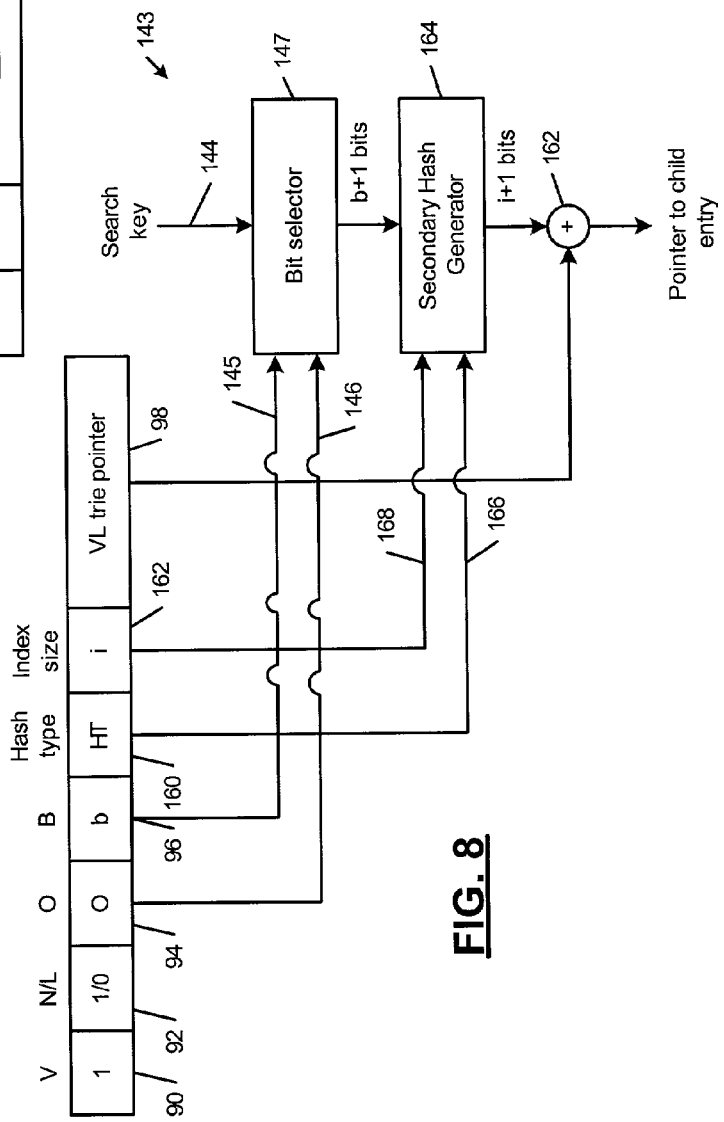

APPARATUS AND METHOD FOR HIGH SPEED FLOW CLASSIFICATION

CROSS-REFERENCE TO RELATED APPLICATIONS

This application claims the benefit of U.S. Provisional Application No. 60/333,707, filed Nov. 27, 2001 which is hereby incorporated by reference. The present invention is related to U.S. patent application Ser. No. 10/179,498, filed Jun. 24, 2002, which is hereby incorporated by reference.

FIELD OF THE INVENTION

The present invention relates to flow classifiers, and more particularly to flow classifiers for high-speed networks.

BACKGROUND OF THE INVENTION

The process of categorizing packets into different flows in a network router or switch is called packet classification. For example, when a computer opens a TCP session with a printer on a network, the computer sends traffic or flow through a router to the printer. Likewise, the printer sends traffic or flow back through the router to the computer.

Packets belonging to the same flow obey a pre-defined rule and are processed in a similar manner by the router. For example, packets with the same source and destination Internet protocol (IP) addresses form a flow. Packet classification is needed for services such as firewalls, quality of service (QOS), and services that require the capability to distinguish and isolate traffic into different flows for processing.

The increased demand for speed, capacity and differentiated services has increased the need for high speed, high capacity, and highly selective flow classifiers. Flow classifiers must be able to process packets at a rate of about 10-20 Mpackets/sec. Flow classifiers must also distinguish up to 2M different flows described by Layer 2-4 parameters. Because flow classification is performed on every packet, flow classification is typically performed in hardware and generally requires hardware acceleration.

Flow classifiers include a search engine and a look up table, which is also called a flow table. Every row in the flow table contains a flow key and a corresponding function. The flow classifier extracts a flow descriptor or search key from the packet. The flow classifier compares the search key to flow keys in the flow table. If a match is found, the packet is processed using the corresponding function. If a match is not found, a default function is applied to the packet.

The search key typically includes selected fields of a header of a packet. The search key may also include internal router parameters such as an ingress port number. The search key may be viewed as a bit string having a fixed length that is created by concatenation of selected packet fields and internal router parameters.

Design of a flow classifier requires balancing of memory requirements and search time. The memory consumed by the look up table is preferably minimized while maintaining a desired search time. Consuming less memory usually increases the number of table lookups. Decreasing the number of table lookups usually increases the size of the flow table and the required system memory.

SUMMARY OF THE INVENTION

A flow classifier according to the present invention for a network device that processes packets including packet headers includes a hash generator that generates hash index values from search keys derived from the packet headers. A hash table receives the hash index values and outputs pointers. A flow table includes flow keys and corresponding actions. A variable length (VL) trie data structure uses the search keys and the pointers to locate the flow keys for the search keys.

In other features, the VL trie data structure selects different flow keys for the search keys that share a common hash index value. The pointers include node, NIL and leaf pointers. The flow classifier performs a default action for the NIL pointers. A pointer calculator accesses a VL trie table using the pointers. When the pointer is a node pointer, the node pointer points to a root entry in the VL trie table.

In other features, the pointer calculator locates a first child entry in the VL trie table using the search key and an offset field, a branch factor field and a pointer field of the root entry. When the first child entry is a node pointer, the pointer calculator locates a second child entry based on the search key and an offset field, a branch factor field and a pointer field of the first child entry. When the second child entry is a node pointer, the pointer calculator locates an $n^{th}$ child entry based on the search key and an offset field, a branch factor field and a pointer field of the second child entry. When the $n^{th}$ child entry is a node pointer, the pointer calculator locates an $(n+1)^{th}$ child entry based on the search key and an offset field, a branch factor field and a pointer field of the $n^{th}$ child entry.

In still other features, the leaf pointers include regular and branching leaf pointers. When one of the child entries of the VL trie table is a branching leaf pointer, the pointer calculator locates a flow key based on the search key and an offset field, a branch factor field and a pointer field of the one of the child entries. When one of the child entries is a regular leaf pointer, the flow classifier locates a flow key associated with the regular leaf pointer. When the pointer is a branching leaf pointer, the pointer calculator locates a flow key based on the search key and an offset field, a branch factor field and a pointer field of the one of the child entries. When one of the child entries is a regular leaf pointer, the flow classifier locates a flow key associated with the regular leaf pointer.

In yet other features, the VL trie table includes entries with a valid/invalid field, an offset field, a branch factor field and a pointer field. The pointer calculator includes a bit selector that receives the valid/invalid field, the offset field from a first VL trie table entry, and the search key. The bit selector outputs one of b and b+1 bits. The pointer calculator further includes a summing circuit having a first input that receives an output of the bit selector and a second input that receives the pointer field from the first VL trie table entry. An output of the summing circuit generates a pointer to one of a child entry of the VL trie table and a flow key of the flow table.

In other features, the entries in the VL trie table further include a hash type field and an index size field. The flow classifier includes a second hash generator that receives an output from the bit selector, the hash type field and the index size field of the first VL trie table entry and generates one of i and i+1 bits. The pointer calculator further includes a summing circuit having a first input that receives an output of the second hash generator and a second input that receives the pointer field of the first VL trie entry. An output of the summing circuit generates a pointer to a child entry.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 7A-7C illustrate exemplary implementations for a set of search keys, VL tries and a flow table;

FIG. 8 is a functional block diagram of an alternate pointer calculator of the VL trie data structure that includes a second hash generator.

DETAILED DESCRIPTION OF THE PREFERRED EMBODIMENTS

Figure 1A:
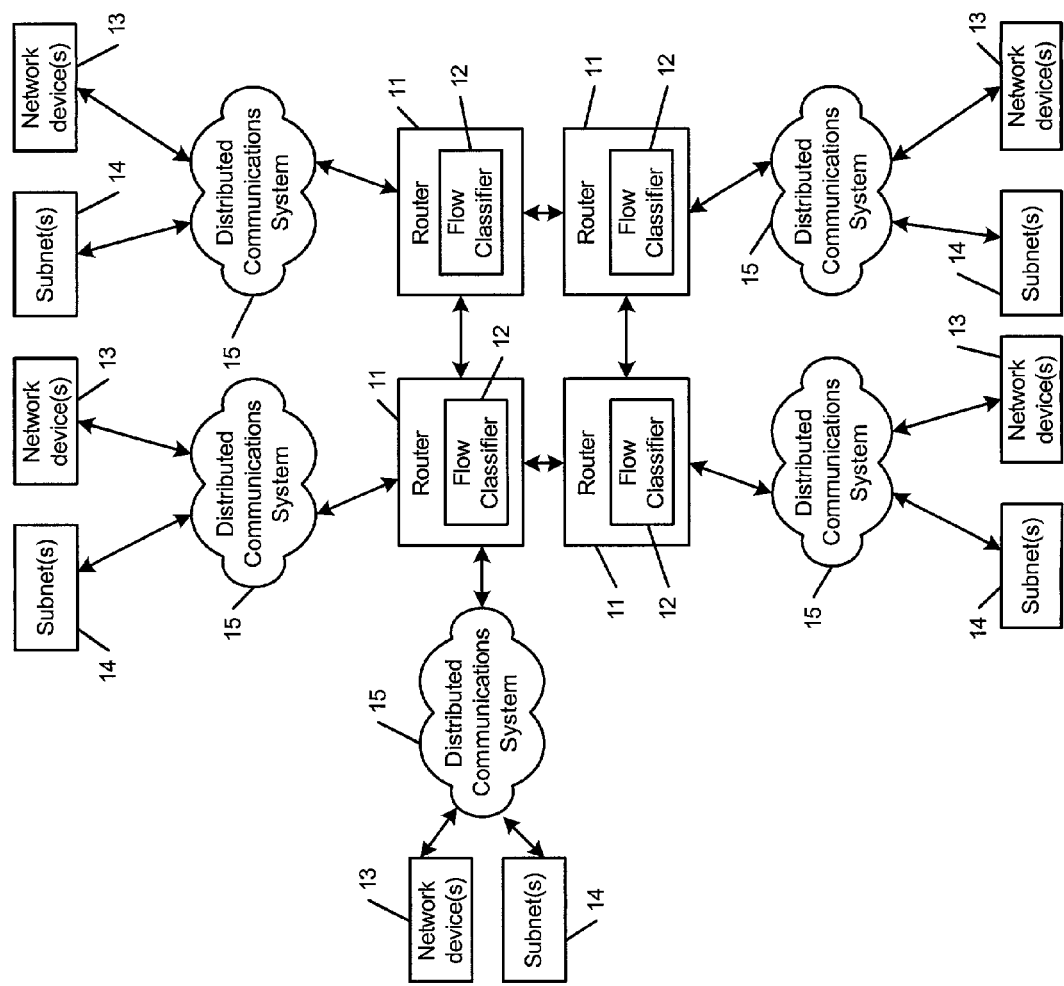
FIG. 1A is a functional block diagram illustrating an exemplary environment for flow classifiers according to the present invention.

The following description of the preferred embodiment(s) is merely exemplary in nature and is in no way intended to limit the invention, its application, or uses. For purposes of clarity, the same reference numbers will be used in the drawings to identify similar elements.

FIG. 1A illustrates an exemplary environment for the flow classifier according to the present invention. The flow classifier is implemented in a network 10 that includes routers 11 with flow classifiers 12 according to the present invention. The network 10 also includes network devices 13, subnet(s) 14 that may include network devices, and distributed communications systems (DCS) 15 such as an Ethernet network, the Internet, or any other suitable network. As can be appreciated, the network 10 may have other configurations. While the foregoing describes the flow classifier in a router, the flow classifier 12 may be used in a packet processor of other network devices.

Figure 1B:
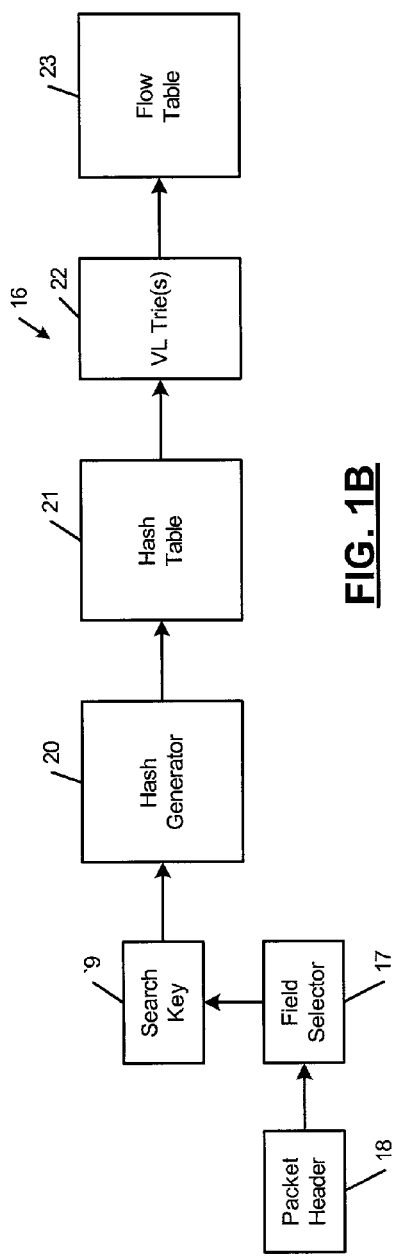
FIG. 1B is a functional block diagram illustrating the flow classifier of FIG. 1A in further detail.

Referring now to FIG. 1B, the flow classifier 12 includes a field selector 17 that selects and concatenates fields of a packet header 18 to generate a search key 19. The field selector 17 may select individual bits and/or bytes of the packet header 18. The field selector 17 outputs all or part of the search key 19 to a hash generator 20. The hash generator 20 generates a hash index to a hash table 21 based on the search key 19. In other words, the hash generator 20 selects an entry in the hash table 21 based on the search key 19. The hash table 21 contains pointers identified by the hash index. The types of pointers include a root node pointer of a VL trie (a node pointer), a leaf pointer to the flow table (a regular leaf or branching leaf pointer), or a NIL pointer. A default action is applied to packets that are associated with NIL pointers.

Multiple search keys may share the same hash index. The flow classifier 12 according to the present invention employs a variable length (VL) trie data structure to separate search keys that share the same hash index to improve performance while reducing memory requirements.

Figure 2:
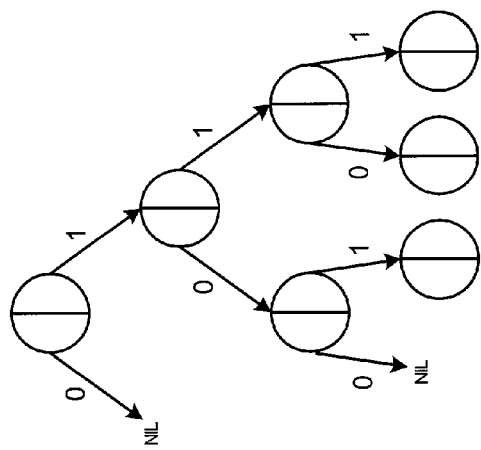
FIG. 2 is a diagram illustrating a binary trie according to the prior art.

Referring now to FIG. 2, an exemplary binary trie structure for the search keys 1111, 1110, and 1101 is shown. VL tries are augmented binary tries. VL tries are not binary, not ordered and not complete. Not binary means that the number of children per node is not restricted to 2. Not ordered means that any node in the VL trie can select any group of bits to test. Not complete means that only a subset of the search key bits may be tested along any path from root to leaf. Only the necessary bits that are required to separate search keys are tested. In a preferred embodiment, a comparison of the entire search key is optionally made in a final stage to ensure that a given search key belongs to a flow.

More particularly, the node structure of the VL tries 22 differs from standard binary tries. First, the VL trie nodes store a branch factor, which determines the number of children of a node. The branch factor is preferably expressed as a power of two. The branch factor is used to compress highly populated levels of the VL trie, which saves memory space and provides a shallow trie depth.

Second, the nodes of the VL trie store the offsets of the bits (differing bits) in the key to be tested. The number of differing bits is determined by the branch factor. The offset is used to select portions of the search key that will provide maximum separation between search keys. Bit offsets that do not contribute to search key separation are not tested. The advantage of traversing a VL trie only to the point where all search keys are separated includes increased search speed as well as a gain in VL trie space. In contrast, the search continues in standard binary tries until all of the bits in a search key are tested.

Third, child nodes are organized in a VL trie table. A parent node stores a single pointer that is the base pointer of the table. The size of the VL trie table is determined by the branch factor of the parent. A child is selected by direct indexing into the VL trie table using the differing bits. Table organization provides a VL trie entry format size that is indifferent to the number of children. This allows a constant memory access time, which simplifies hardware design.

Figure 3:
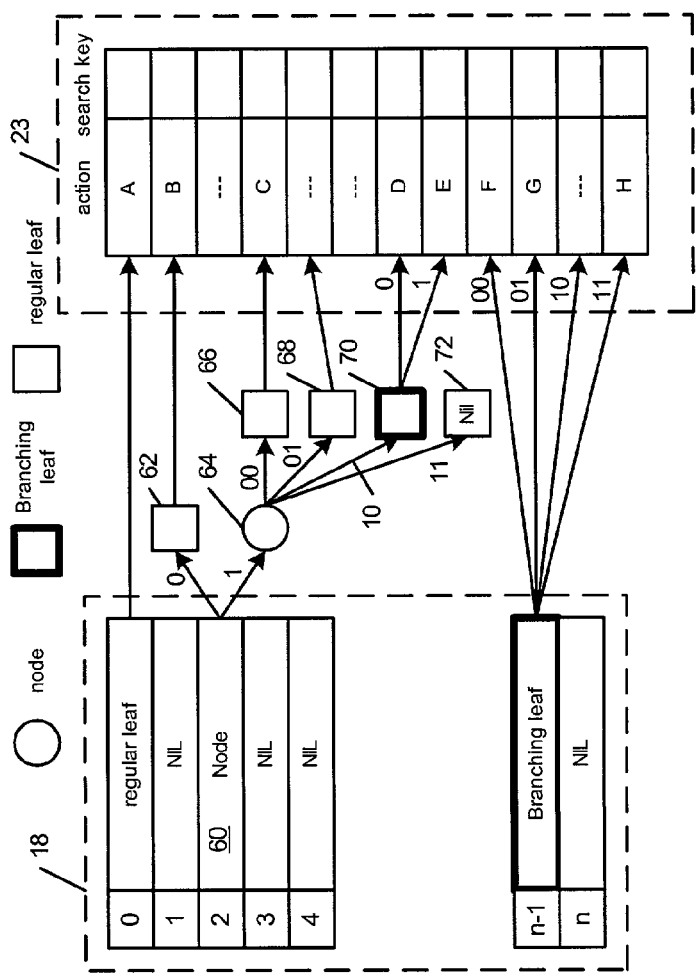
FIG. 3 is an example illustrating the operation of the flow classifier of FIG. 1B.

For example, the hash table 21 shown in FIG. 3 includes the NIL entries (1, 3, 4, n), leaf entries (0, n−1) and VL node entry (2). There are two types of leaf nodes. A regular leaf has a branch factor of one. A branching leaf has a branch factor greater than 1 and a single flow key. VL nodes have VL trie entries as children. A branching leaf is similar to a node with flow keys as children.

In the example illustrated in FIG. 3, the hash generator 20 generates a first value in the hash table 21 corresponding to a root node of the VL trie (in this case VL node 60). The VL node 60 branches into a regular VL leaf 62 and a VL node 64. The VL node 64 branches into regular VL leafs 66 and 68, branching VL leaf 70 and NIL 72. The regular VL leaf 62 is associated with an action B in the flow table 23. The branching leaf 70 branches into actions D and E in the flow table 23.

Hash collision occurs when the same hash table index is generated for more than one search key 19. Hash collisons are resolved by traversing the VL trie 22 rooted at the hash table entry pointed by the hash index. The VL trie 22 is iterated until a VL trie leaf entry or a NIL entry are encountered. For example, the search for actions A, B, and C is terminated by a regular VL leaf entry. The search for actions D, E, F, and G are terminated by branching VL leaf entries. To guarantee a wire speed search for a given hardware implementation, the stages are preferably bounded to x levels where: 1 level accesses the hash table 21, at most x-2 levels access the VL tries 22, and 1 level accesses the flow table 23.

Figure 4A:
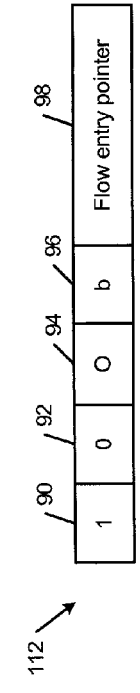
FIGS. 4A-4E illustrates an exemplary behavioral entry format for a VL trie data structure.

Referring now to FIGS. 4A-4E, a suitable behavioral VL trie entry format is shown. In FIG. 4A, a template 100 for the VL trie data structure is shown. The template 100 includes a first field 90 containing a valid/invalid indicator (where 1=valid and 0=invalid). A second field 92 contains a node/leaf indicator (where 1=node and 0=leaf). A third field 94 contains a bit offset. A fourth field 96 contains a branch factor. A fifth field 98 contains a pointer. As can be appreciated, the relative ordering of the first through fifth fields 92-98 and the number of bits/bytes used can be varied in the template 100. Also, fields 94, 96 may repeat up to N times in the same entry to enable selection of several groups of bits from the search key.

Figure 4B:
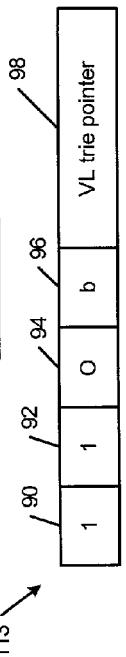

Referring now to FIG. 4B, an exemplary format for an invalid entry type is shown at 104. The first field 90 is equal to "0". The remaining fields are not applicable (NA). The invalid entry type is used to indicate a failed search. The flow classifier acts according to a default action when the search fails.

Figure 4C:
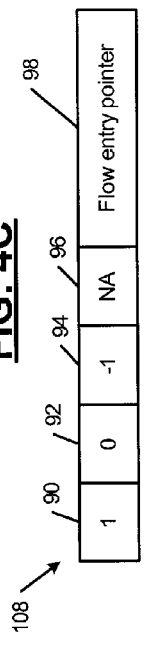

Referring now to FIG. 4C, an exemplary format for a regular VL leaf is shown at 108. The first field 90 is equal to 1, the second field 92 is equal to "0", the third field 94 is equal to "−1", the fourth field 96 is not applicable, and the fifth field 98 is equal to a flow key pointer of the flow table 23. The flow classifier reads the flow key that is specified by the flow key pointer.

Figure 4D:
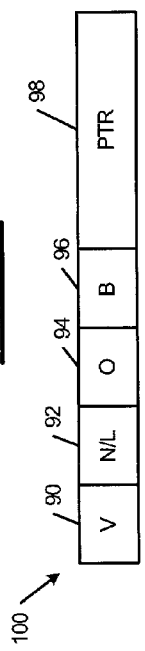

Referring now to FIG. 4D, an exemplary format for a branching leaf is shown at 112. The first field 90 is equal to "1", the second field 92 is equal to "0", the third field 94 is equal to a bit offset O, the fourth field 96 is equal to a branch factor b, and the fifth field 98 is equal to a flow key pointer of the flow table 23. The flow classifier reads the flow key that is specified by the flow key pointer+key[O:O+b].

Figure 4E:
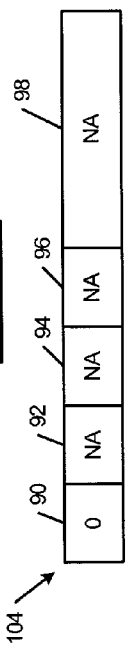

Referring now to FIG. 4E, an exemplary format for a node is shown at 113. The first field 90 is equal to "1", the second field 92 is equal to "1", the third field 94 is equal to a bit offset O, the fourth field 96 is equal to a branch factor b, and the fifth field 98 is equal to a VL trie pointer of a VL trie. The flow classifier reads the VL trie entry that is specified by the flow key pointer+key[O:O+b]. As can be appreciated by skilled artisans, the field lengths, the number of fields, and selected flag values in the VL trie entry format can be varied without departing from the scope of the invention.

Figure 4F:
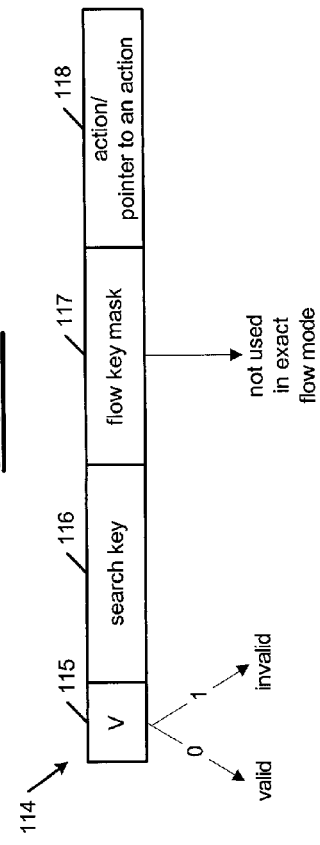
FIG. 4F illustrates a behavioral flow table entry format.

In FIG. 4F, a behavioral flow table entry format 114 is shown. The flow table entry format 114 includes a valid field 115, a search key field 116, a flow key mask 117, and an action/pointer field 118 that points to an action or a pointer. The flow key mask field 117 is not used for exact flows, as will be described further below.

Figure 5:
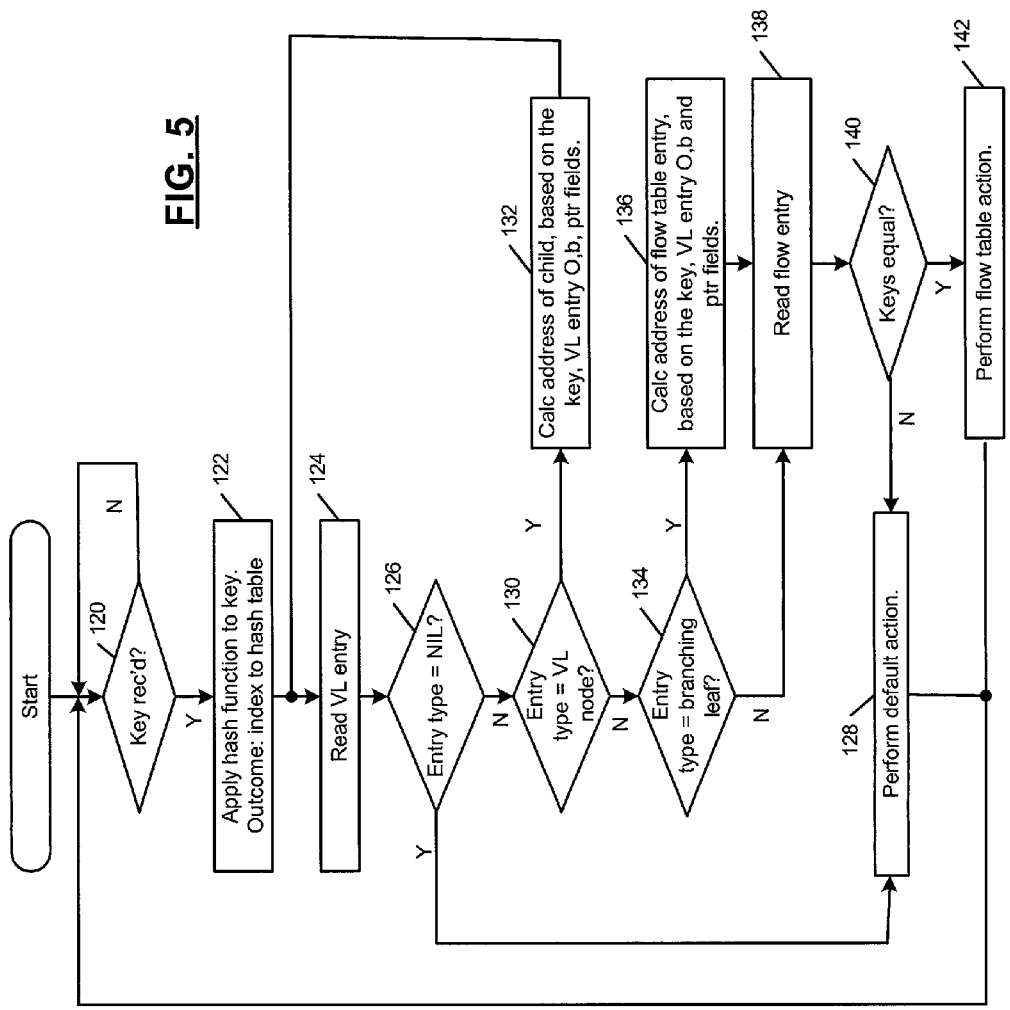
FIG. 5 is a flowchart illustrating the operation of the flow classifier.

Referring now to FIG. 5, the search key 19 is processed by the hash generator 20. Upon receiving a search key in step 120, the hash generator 20 applies a hash function in step 122. In step 124, the VL entry is read. The VL entry is one of a NIL entry, a VL trie node entry, or a VL trie regular or branching leaf entry. If a NIL entry is returned as determined in step 126, the search is terminated and a default action is performed in step 128.

If a VL trie node is returned as determined in step 130, an address of a child is calculated in step 132 based on the search key, VL entry O, branch factor and pointer fields. Control continues from step 132 to step 124. If a VL trie branching leaf node is returned as determined in step 134, an address of a flow key is calculated in step 136 based on the search key, VL entry O, branch factor and pointer fields. Control continues from steps 134 (if false) and step 136 to step 138. In step 138, the flow key is read. In step 140, the search key is compared to the flow key. If they are equal, the flow table action is performed in step 142. Otherwise, the default action is performed in step 128.

Figure 6:
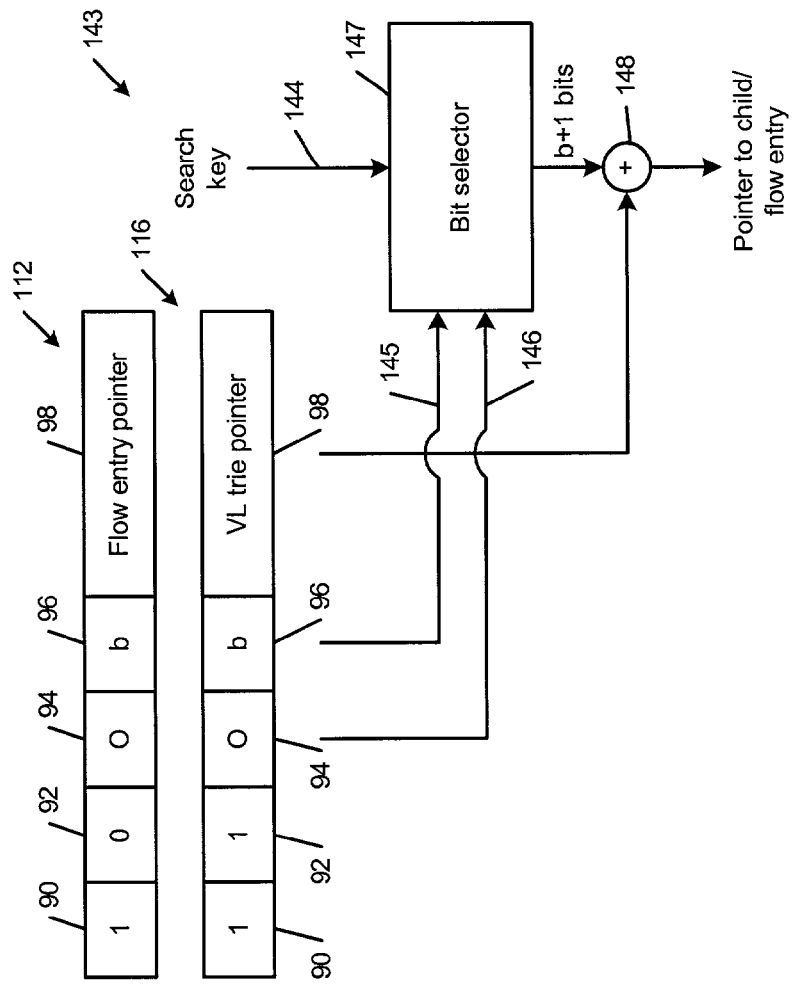
FIG. 6 is a functional block diagram of a pointer calculator of the VL trie data structure.

Referring now to FIG. 6, a pointer calculator 143 for VL trie node and VL trie branching leaf entries is shown. A search key 144, a branch factor 145 and a bit offset 146 for the branching leaf entry 112 or for the node entry 113 are input to a bit selector 147. The bit selector 147 selects a group of b+1 consecutive bits (with b starting at 0) that are added by an adder 148 to the flow key pointer 98 for the branching leaf entry 112 or to the VL trie pointer 98 for the node entry 113. The pointer calculator 143 generates a pointer to a child entry or a flow key.

Referring now to FIGS. 7A, 7B and 7C, VL tries that separate exemplary 4-bit search keys 1111, 1110, and 1101 are shown. Bit offsets 0 and 1 (counting from the MSb) are identical for all of the search keys. Therefore, these bit offsets do not contribute to separation of the search keys. In FIG. 7A, an ordinary VL trie starting from bit offset 2 (or the third bit in the search key) is shown. A root node 149 includes a base pointer that points to a VL trie including the regular leaf 108-1 and the node 113. The regular leaf 108-1 points to a flow key with a corresponding action 150. The node 113 points to regular leafs 108-2 and 108-3. The regular leafs 108-2 and 108-3 point to flow keys with corresponding actions 151 and 152. The sample trie consumes 5 VL entries and 3 flow keys. The maximum depth of the VL trie is 4.

Referring now to FIG. 7B, the branching leaves can be used to reduce the depth of the VL trie and its space. A base pointer points to a regular leaf 108-4 and a branching leaf 112-1. The regular leaf 108-4 points to a flow key and corresponding action 153. The branching leaf 112-1 points to flow keys and corresponding actions 154 and 155. The sample trie consumes 3 VL entries and 3 flow keys. The maximum depth of the VL trie is 3.

Referring now to FIG. 7C, a branch factor combined with branching leaves can be used to further reduce the depth of the VL trie at the expense of enlarging the flow table space. A base pointer points to a branching leaf 112-2. The branching leaf 112-2 points to flow keys and corresponding actions 156, 157 and 158. The sample trie consumes 1 VL entry and 4 flow keys. The maximum depth of the VL trie is 2.

Secondary hashing is preferably employed when VL nodes are sparse. A sparse VL node has a high (NIL children)/(total children) ratio. Sparse nodes consume too much memory. For example, the set of 4-bit search keys 0001, 0010, 0100, and 1000 is not handled efficiently by VL tries, because it requires testing 4 bits for only 4 keys. A secondary hash function according to the present invention is provided to compress sparse nodes. The secondary hash function takes b+1 bits selected by the offset and branch factor fields and generates a compressed index of i bits, where i<b.

Referring now to FIG. 8, a secondary hash function is integrated with the pointer calculator 143 of FIG. 6. Additional fields that are added to the VL trie entry include a hash type field 160 and an index size field 162. The hash type 160 and the index size 162 are input to a secondary hash generator 164 as indicated at 166 and 168.

The secondary hash generator 164 also receives the b+1 consecutive bits (where b starts at 0) selected by the bit selector 147. The secondary hash generator 164 generates i+1 bits (where i starts at 0) that are added to the VL trie pointer 98 to generate a pointer to a child entry. The actual branch factor is determined by the index size of the hash function. The branch factor field selects the number of bits for the hash input. The secondary hash generator 164 is used on VL trie nodes.

Exact match searching that is described above can be extended for range match searching using wildcards (such as "?") to represent both "0" and "1" values in bit locations. A range search key is a compact representation of multiple exact search keys. Extending the exact search engine in the flow classifier to support range searching allows the database resources to be used more effectively.

To support range matching, a search key mask is added. Search keys with a wild-card cannot be stored in binary form since the bits would have three possible values. Therefore, an additional field is added to the flow key for storing a flow key mask as shown in FIG. 4F. For example, the search key "?11?1010" is represented by a search key equal to "01101010" and a flow key mask equal to "01101111". In this example, a mask index equal to "0" indicates an index of "?" in the search key. As can be appreciated, the mask index can be set equal to 1 for an index of "?" in the search key. There are three masking points, two at the template (hash mask, search key mask) and one in every flow key (flow key mask).

The hash and search key masks are used for exact and range flows. Search key masks are used to select individual bits from a byte. In one implementation, the packet field selector operates at byte resolution and selects whole bytes. Search key masks mask out unnecessary bits from a selected byte. Search key masks allow search keys to be built using bit resolution. Hash masks hide portions of the search key from the hash generator when the hash generator operates on partial search keys. The flow key mask is required for range matching.

Figure 9:
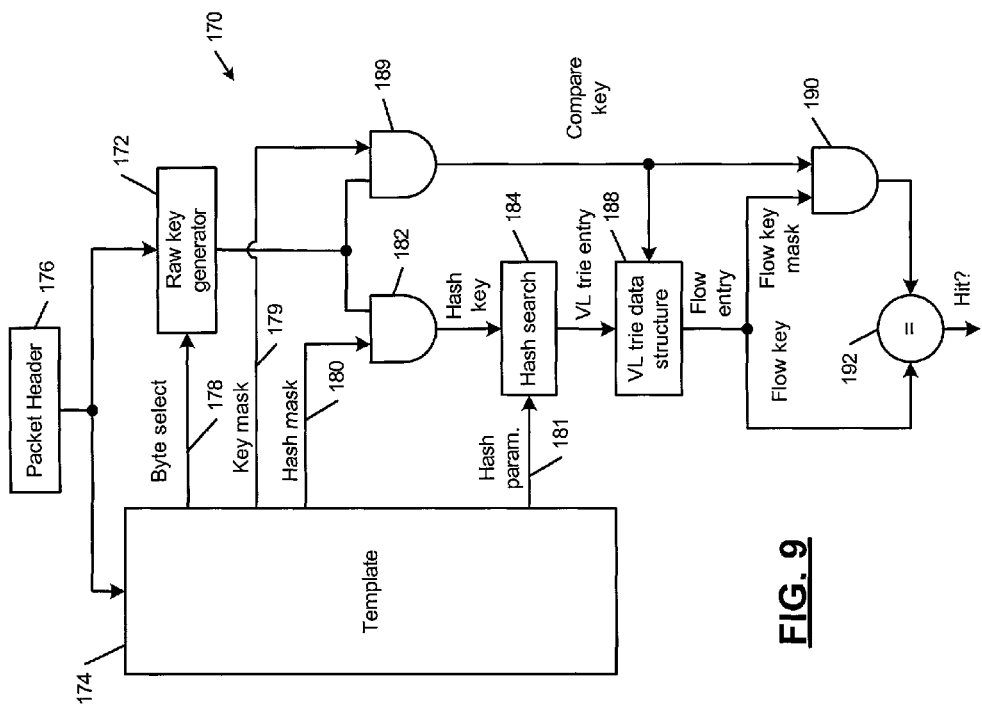
FIG. 9 is a range matching search flow diagram.

Referring now to FIG. 9, implementation of the complete search process is shown generally at 170. A raw key generator 172 and a template 174 receive a packet header 176. The template 172 generates a byte select 178, a search key mask 179, a hash mask 180 and hash parameters 181. The hash mask 180 and the raw key are input to an AND gate 182. A hash key is generated by the AND gate 182. The hash key and the hash parameters 181 are input to a hash search table 184. The hash search table 184 outputs a VL trie entry to a VL trie data structure 188 that outputs a flow key.

The raw key and the key mask 179 are input to an AND gate 189, which generates a compare key. The compare key and a byte mask are input to an AND gate 190. An output of the AND gate 190 and the search key are compared by a comparator 192. If the search key and the output of the AND gate 190 match, a hit signal is generated by the comparator 192.

For example, a set of four bit keys includes key A=[111?] and key B=[?000]. Patterns that are not matched by A or B are handled according to a default action or route. A hash mask [0110] selects the unmasked bit indices in the search keys. A key mask [1111] selects all of the bit indices forming a search key. A flow key key/mask pair for A is equal to [1110,1110]. A flow key key/mask pair for B is equal to [0000,0111].

Assuming that the hash function produces the same index for the hash keys [0110] and [0000] (111? & 0110, ?000 & 0110), the collision is resolved by designing a VL trie with a single branching leaf testing bit index #1, which is a second key bit from the MSB.

A search for the pattern [1111] will proceed as follows: the hash key is (1111&0110=0110), which selects the VL trie branching leaf. Testing bit index 1 in the compare key (1111&1111=1111) results in a pointer to flow key key A. Comparing the byte masked compare key to the search key (1111&1110=1110) yields a match.

A search for the pattern [0111] will proceed as follows: the hash key is (0111&0110=0110), which selects the VL trie branching leaf. Testing bit index 1 in the compare key (0111&1111=0111) results in a pointer to flow key key A. Comparing the byte masked compare key to the search key (0111&1110=1110) yields inequality. Exact matching is a similar to range matching with the following simplifications:

the hash mask and the key mask are equal. The mask field in the flow key is not used. In other words, the mask field is set equal to all 1's or 0's.

In the preferred embodiment, the search key 19 includes 20 bytes of a 128 byte packet header. Each template can have its own hash table. However, in the preferred embodiment, the hash tables are shared among multiple templates as long as the keys are identical (same byte and key mask selection). The hash function, however, does not need to be identical. Preferably, the flow table is shared by all hash functions. Flow key size varies from two to five words of 64 bits or multiples thereof.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A flow classifier for a network device that processes packets including packet headers, comprising:
    a hash generator, implemented with a processor, that generates hash index values from search keys derived from said packet headers;
    a hash table that receives said hash index values and that outputs pointers;
    a flow table including flow keys and corresponding actions; and
    a variable length (VL) trie data structure that uses said pointers and said search keys to locate said flow keys and said corresponding actions for said search keys.

2. The flow classifier of claim 1 wherein said VL trie data structure selects different flow keys for said search keys that share a common hash index value.

3. The flow classifier of claim 1 wherein said pointers include node, NIL and leaf pointers and wherein said flow classifier performs a default action for said NIL pointers.

4. The flow classifier of claim 3 further comprising a pointer calculator that accesses a VL trie table using said pointers.

5. The flow classifier of claim 4 wherein when said pointer is a node pointer, said node pointer points to a root entry in said VL trie table.

6. The flow classifier of claim 5 wherein said pointer calculator locates a first child entry in said VL trie table using said search key and an offset field, a branch factor field and a pointer field of said root entry.

7. The flow classifier of claim 6 wherein when said first child entry is a node pointer, said pointer calculator locates a second child entry based on said search key and an offset field, a branch factor field and a pointer field of said first child entry.

8. The flow classifier of claim 7 wherein when said second child entry is a node pointer, said pointer calculator locates an nth child entry based on said search key and an offset field, a branch factor field and a pointer field of said second child entry.

9. The flow classifier of claim 8 wherein when said nth child entry is a node pointer, said pointer calculator locates an (n+1)th child entry based on said search key and an offset field, a branch factor field and a pointer field of said nth child entry.

10. The flow classifier of claim 9 wherein said leaf pointers include regular and branching leaf pointers.

11. The flow classifier of claim 10 wherein when one of said child entries of said VL trie table is a branching leaf pointer, said pointer calculator locates a flow key based on said search key and an offset field, a branch factor field and a pointer field of said one of said child entries.

12. The flow classifier of claim 10 wherein when one of said child entries is a regular leaf pointer, said flow classifier locates a flow key associated with said regular leaf pointer.

13. The flow classifier of claim 10 wherein when said pointer is a branching leaf pointer, said pointer calculator locates a flow key based on said search key and an offset field, a branch factor field and a pointer field of said one of said child entries.

14. The flow classifier of claim 10 wherein when one of said child entries is a regular leaf pointer, said flow classifier locates a flow key associated with said regular leaf pointer.

15. The flow classifier of claim 4 wherein said VL trie table includes entries with a valid/invalid field, a pointer field, an offset field, a branch factor field and a pointer field.

16. The flow classifier of claim 15 wherein said pointer calculator includes a bit selector that receives said valid/invalid field, said branch factor field, said offset field from a first VL trie table entry, and said search key, wherein said bit selector outputs one of b and b+1 consecutive bits.

17. The flow classifier of claim 16 wherein said pointer calculator further includes a summing circuit having a first input that receives an output of said bit selector and a second input that receives said pointer field from said first VL trie table entry, wherein an output of said summing circuit generates a pointer to one of a child entry of said VL trie table and a flow key of said flow table.

18. The flow classifier of claim 17 wherein said entries in said VL trie table further include a hash type field and an index size field, and further comprising a second hash generator that receives an output from said bit selector, said hash type field and said index size field of said first VL trie table entry and that generates one of i and i+1 consecutive bits.

19. The flow classifier of claim 18 wherein said pointer calculator further includes a summing circuit having a first input that receives an output of said second hash generator and a second input that receives said pointer field of said first VL trie entry, wherein an output of said summing circuit generates a pointer to a child entry.

20. The flow classifier of claim 1 wherein said flow classifier handles packets in a router.

21. A flow classifier for a router that routes packets with packet headers, comprising:
a field selector that generates search keys from said packet headers;
a hash generator, implemented with a processor, that generates hash index values from said search keys;
a hash table that outputs pointers based on said hash index values; and
a variable length (VL) trie data structure that receives said pointers.

22. The flow classifier of claim 21 wherein said VL trie data structure includes a VL trie table having entries with a valid/invalid field, an offset field, a branch factor field and a pointer field.

23. The flow classifier of claim 22 further comprising a flow table including a plurality of flow keys, wherein each of said flow keys is associated with an action.

24. The flow classifier of claim 23 wherein said VL trie data structure uses said pointers and a pointer calculator to select a flow key for a search key.

25. The flow classifier of claim 24 wherein said pointers include NIL pointers, regular and branching leaf pointers, and node pointers.

26. The flow classifier of claim 21 wherein said field selector generates said search keys for said packets by selecting and concatenating fields of said header.

27. The flow classifier of claim 25 wherein when said pointer is a node pointer, said node pointer points to a root entry in said VL trie table.

28. The flow classifier of claim 27 wherein said pointer calculator locates a first child entry in said VL trie table using said search key and said offset field, said branch factor field and said pointer field of said root entry, wherein when said first child entry is a node pointer, said pointer calculator locates a second child entry based on said search key and said offset field, said branch factor field and said pointer field of said first child entry, wherein when said second child entry is a node pointer, said pointer calculator locates an $n^{th}$ child entry based on said search key and said offset field, said branch factor field and said pointer field of said second child entry, and wherein when said $n^{th}$ child entry is a node pointer, said pointer calculator locates an $(n+1)^{th}$ child entry based on said search key and said offset field, said branch factor field and said pointer field of said $n^{th}$ child entry.

29. The flow classifier of claim 28 wherein when one of said child entries of said VL trie table is a branching leaf pointer, said pointer calculator locates a flow key based on said search key and said offset field, said branch factor field and said pointer field of said one of said child entries.

30. The flow classifier of claim 29 wherein when one of said child entries is a regular leaf pointer, said flow classifier locates a flow key associated with said regular leaf pointer.

31. A method for processing packets including packet headers in a network device, comprising:
generating hash index values from search keys derived from said packet headers;
generating pointers from said hash index values;
providing a flow table including flow keys and corresponding actions; and
using a variable length (VL) trie data structure and said pointers and said search keys to locate said flow keys for said search keys.

32. The method of claim 31 further comprising selecting different flow keys for said search keys that share a common hash index value.

33. The method of claim 31 wherein said pointers include node, NIL and leaf pointers and further comprising performing a default action for said NIL pointers.

34. The method of claim 33 further comprising accessing a VL trie table using said pointers.

35. The method of claim 34 further comprising pointing to a root entry in said VL trie table when said pointer is a node pointer.

36. The method of claim 35 further comprising locating a first child entry in said VL trie table using said search key and an offset field, a branch factor field and a pointer field of said root entry.

37. The method of claim 36 further comprising locating a second child entry based on said search key and an offset field, a branch factor field and a pointer field of said first child entry when said first child entry is a node pointer.

38. The method of claim 37 further comprising locating an nth child entry based on said search key and an offset field, a branch factor field and a pointer field of said second child entry when said second child entry is a node pointer.

39. The method of claim 38 further comprising locating an (n+1)th child entry based on said search key and an offset field, a branch factor field and a pointer field of said nth child entry when said nth child entry is a node pointer.

40. The method of claim 39 wherein said leaf pointers include regular and branching leaf pointers.

41. The method of claim 40 further comprising locating a flow key based on said search key and an offset field, a branch factor field and a pointer field of said one of said child entries when one of said child entries of said VL trie table is a branching leaf pointer.

42. The method of claim 40 further comprising locating a flow key associated with said regular leaf pointer when one of said child entries is a regular leaf pointer.

43. The method of claim 40 further comprising locating a flow key based on said search key and an offset field, a branch factor field and a pointer field of said one of said child entries when said pointer is a branching leaf pointer.

44. The method of claim 40 further comprising locating a flow key associated with said regular leaf pointer when one of said child entries is a regular leaf pointer.

45. The method of claim 34 wherein said VL trie table includes entries with a valid/invalid field, an offset field, a branch factor field and a pointer field.

46. The method of claim 45 further comprising:
receiving said valid/invalid field, said offset field from a first VL trie table entry, and said search key; and
outputting one of b and b+1 consecutive bits.

47. The method of claim 46 further comprising:
summing said one of the b and b+1 consecutive bits and said pointer field from said first VL trie table entry; and
generating a pointer to one of a child entry of said VL trie table and a flow key of said flow table.

48. The method of claim 47 wherein said entries in said VL trie table further include a hash type field and an index size field, and further comprising:
receiving said one of the b and b+1 consecutive bits, said hash type field and said index size field of said first VL trie table entry; and
generating one of i and i+1 consecutive bits.

49. The method of claim 48 further comprising:
summing said one of the i and i+1 consecutive bits and said pointer field of said first VL trie entry; and
generating a pointer to a child entry.

50. The method of claim 31 further comprising handling packets in a router.

* * * * *